United States Patent
Kovach et al.

(10) Patent No.: US 6,625,894 B1
(45) Date of Patent: Sep. 30, 2003

(54) POSITION-ADJUSTING DEVICE

(75) Inventors: John A. Kovach, Willoughby, OH (US); Joseph G. Bolden, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/590,706

(22) Filed: Jun. 8, 2000

(51) Int. Cl.⁷ .............................. G01B 5/00; B23B 25/06
(52) U.S. Cl. ............................................ 33/201; 33/503
(58) Field of Search .......................... 82/151, 115, 158, 82/170, 173, 122, 117; 33/201, 548, 549, 503, 504

(56) References Cited

U.S. PATENT DOCUMENTS

| | | | |
|---|---|---|---|
| 3,826,011 A | * 7/1974 | D'Aniello | 33/642 |
| 3,920,971 A | * 11/1975 | Bevis et al. | 702/168 |
| 4,031,628 A | * 6/1977 | Kaesemeyer | 33/201 |
| 4,228,595 A | * 10/1980 | Steinbach | 33/201 |
| 4,251,922 A | * 2/1981 | Perlotto | 33/548 |
| 4,329,785 A | * 5/1982 | Peterson | 33/628 |
| 4,631,834 A | * 12/1986 | Hayashi et al. | 33/503 |
| 4,778,313 A | * 10/1988 | Lehmkuhl | 409/127 |
| 5,611,147 A | * 3/1997 | Raab | 33/503 |
| 5,620,356 A | * 4/1997 | Lackey et al. | 451/5 |
| 5,724,745 A | * 3/1998 | Brenner et al. | 33/503 |
| 5,883,313 A | * 3/1999 | Ercole et al. | 73/865.8 |

FOREIGN PATENT DOCUMENTS

| | | | |
|---|---|---|---|
| EP | 270721 A1 | * 6/1988 | G01B/5/00 |
| JP | 2-147806 | * 6/1990 | |

OTHER PUBLICATIONS

Machining Center Tooling, Kennametal Catalogue No. 7050, pp. 861 and 863 (1997).

* cited by examiner

Primary Examiner—Henry W. H. Tsai
(74) Attorney, Agent, or Firm—Larry R. Meenan

(57) ABSTRACT

A device and method for adjusting the position of machine tools relative to tool clamps. The device includes a plurality of tool clamps, a surface plate defining a flat surface, an adjustment member and a gauging system. Each tool clamp is adapted to support a tool relative to the flat surface. The adjustment member is adapted to adjust each tool relative to a respective one of the tool clamps and a gauging system including a measuring unit adapted to engage each of the tools in each respective one of the tool clamps and to move to any desired position along a common plane to permit the measuring unit to align with each of the tools supported by each respective tool clamp.

19 Claims, 5 Drawing Sheets

US 6,625,894 B1

POSITION-ADJUSTING DEVICE

FIELD OF THE INVENTION

This invention generally relates to adjusting devices for machine tools and is specifically concerned with a device for presetting the position of a plurality of machine tools relative to one another.

BACKGROUND OF THE INVENTION

Devices for adjusting the position of machine tools are known in the prior art. However, before such adjusting devices are described, a brief description of the mechanical context of such devices will be given.

Some machining operations require a dual spindle application. The spindles are generally operated simultaneously by a program to perform the same movement to machine identical parts. For example, wing spars of aircraft are commonly machined from raw material, such as aluminum blocks. When milling cavities and creating webs in the aluminum blocks, it is critical that the cavities and webs be milled and created identically with respect to identical parts. The aluminum blocks are generally supported by a machine that permits horizontal operation of its spindles in an area about 100 feet long and 30 feet high. Acceptable tolerances in such an operating environment are within ±1.00 inch.

To reduce the risk of unacceptable tolerances occurring, dual spindle machine tools must be set up the same. To accomplish this, such tools are commonly supported by thermal gripping adapters. One end of each adapter has a bore therein for receiving a respective tool. Another end of each adapter is provided with a shank that is adapted to engage a respective spindle. The diameter of each bore is slightly smaller than that of the machine tools. A "shrinker" includes a coil that may be electrically charged to heat the adapter. This causes the bore to expand. In this expanded condition, the bore may receive a respective tool. The tool is inserted into the bore until a collar or clamp engages the adapter. At this juncture, the adapter is permitted to cool. As it cools, the bore contracts to grip the tool, creating an interference fit between the tool and the adapter.

To reduce the risk of unacceptable tolerances occurring, the tools are precisely pre-set in the clamps and then precisely gripped by the adapter. Ideally, the tools must be pre-set within the clamps within ±0.0005 inch of each other and then gripped by the adapters within ±0.0005 inch of each other. This produces an acceptable tolerance of ±0.001 inch.

To minimize unacceptable tolerances with respect to positioning the tools relative to respective clamps, position adjustment devices were developed in the prior art. In one of the most common designs, a clamp is releasably supported relative to a supporting surface by a "pot". A measuring unit is aligned with the clamp in a spaced relation relative to the clamp. A tool may be placed in the clamp and the measuring unit may engage the tool. A fine adjustment screw is adapted to be adjusted to vary the position of the tool relative to the clamp. Once a desired position is achieved, the clamp may be tightened to hold the tool in a fixed position. Once the clamp is tightened, the tool with the clamp tightened thereto may be removed from the pot and inserted into the thermal gripping adapter. Additional tools may be positioned in additional clamps with the same device by following the same sequence of steps.

While such prior art devices are capable of positioning tools in clamps, the applicants have observed a shortcoming associated with such devices. For example, positioning successive tools through the use of a single pot is inefficient and complicated in that it requires the successive steps of supporting and removing successive tools and clamps.

Clearly, there is a need for a device for making fine adjustments to the position of a plurality of machine tools which are easier and faster to use than prior art adjusting devices. Ideally, such a position-adjusting device would minimize the cost of setting up tools for operation in a dual spindle machine.

SUMMARY OF THE INVENTION

Generally speaking, the invention is directed to a device for adjusting the position of a machine tool. The device comprises a surface plate defining a flat surface. A plurality of clamps are supported relative to the flat surface. Each clamp is adapted to support a tool. An adjustment member is adapted to adjust each tool relative to a respective one of the clamps.

The method may provide a clamp and a measuring device spaced apart from the clamp. A tool may be inserted into the clamp. Next, the tool may be engaged with the measuring device. Now, the position of the tool may be adjusted to achieve a desired measurement by the measuring device. Finally, the clamp may be tightened upon the tool to hold the tool in a fixed position. At least one additional clamp may be provided and the clamps may be co-planar relative to one another. An additional tool may be inserted in the additional clamp. The measuring device may be aligned with the additional tool after the first clamp is tightened to hold the first tool in a fixed position. With the measuring device in a fixed position, the additional tool is engaged with the measuring device. The position of the additional tool is adjusted to achieve a measurement by the measuring device identical to that of the first tool. The additional clamp is tightened upon the additional tool to hold the additional tool in a fixed position.

Advantageously, the adjustment device is easily and highly controllable for fine position adjustments. A common placement of clamps reduces the risk of error occurring in positioning tools and assists in holding the tools in a fixed position that is common to one another. The method of the invention advantageously provides an easy technique for positioning tools and holding the tools in a fixed position relative to one another.

DETAILED DESCRIPTION OF THE INVENTION

Figure 1:
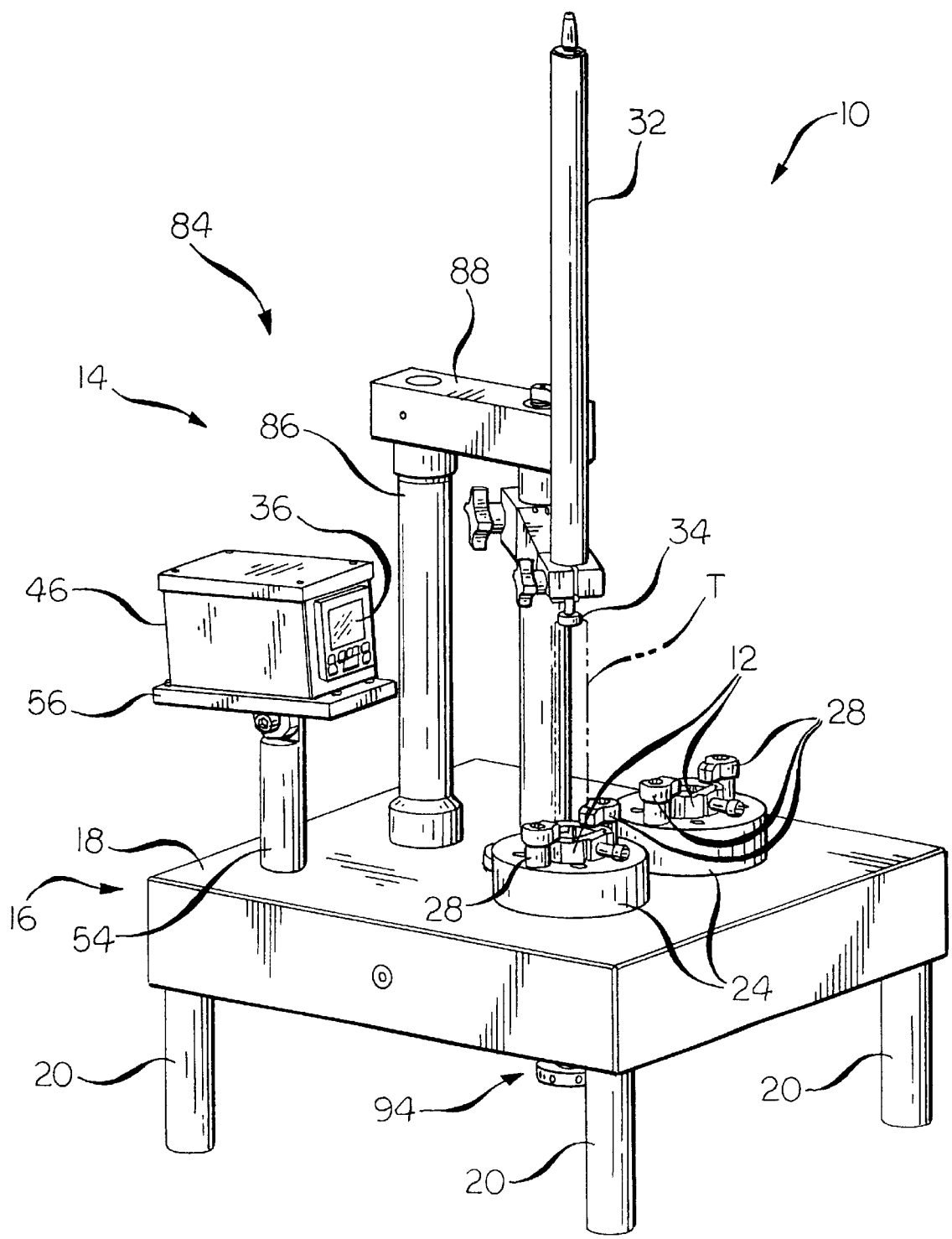
FIG. 1 is a perspective view of a position-adjusting device of the invention.
Figure 2:
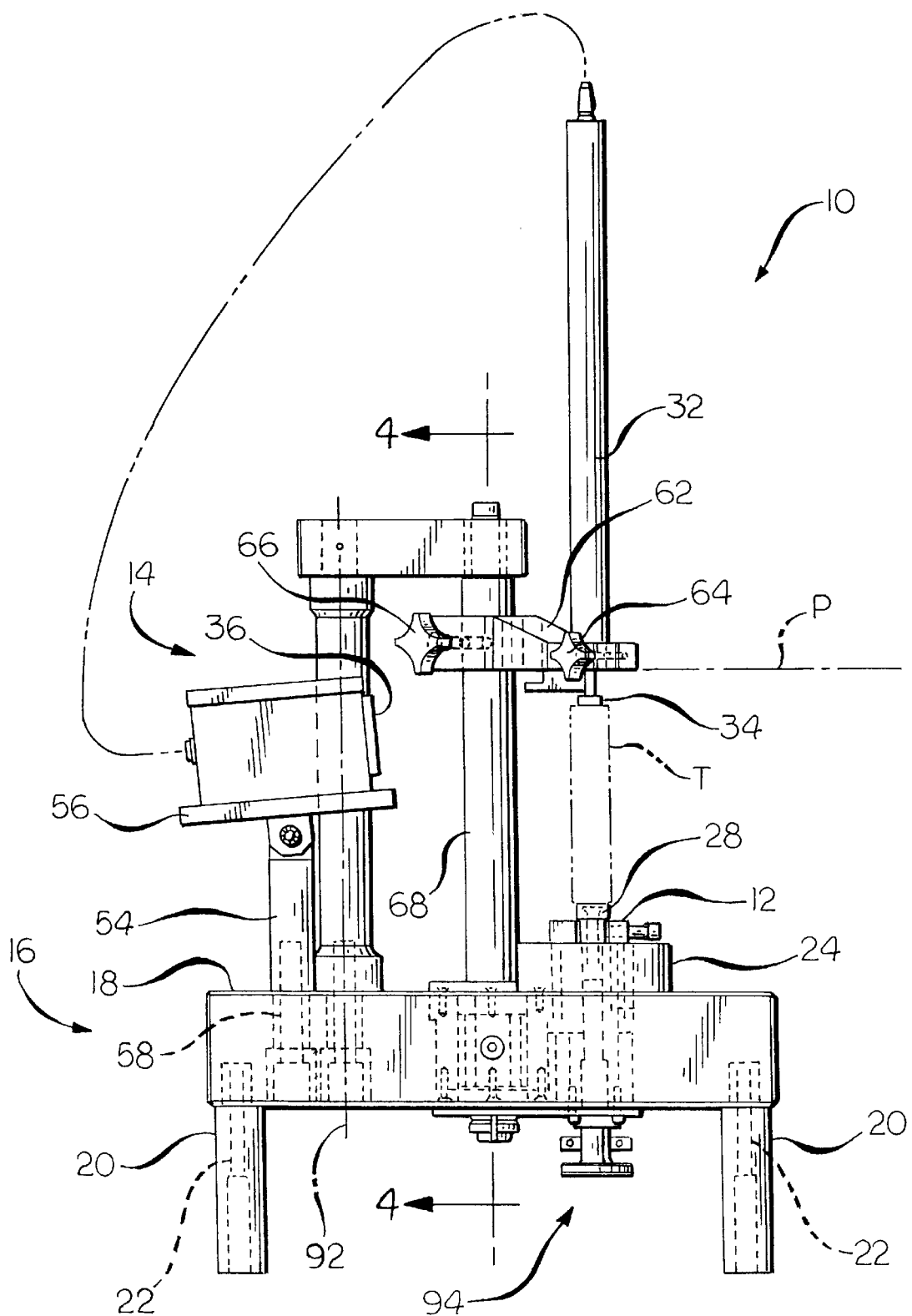
FIG. 2 is a side elevational view of the device illustrated in FIG. 1 with a machine tool shown in phantom line.
Figure 3:
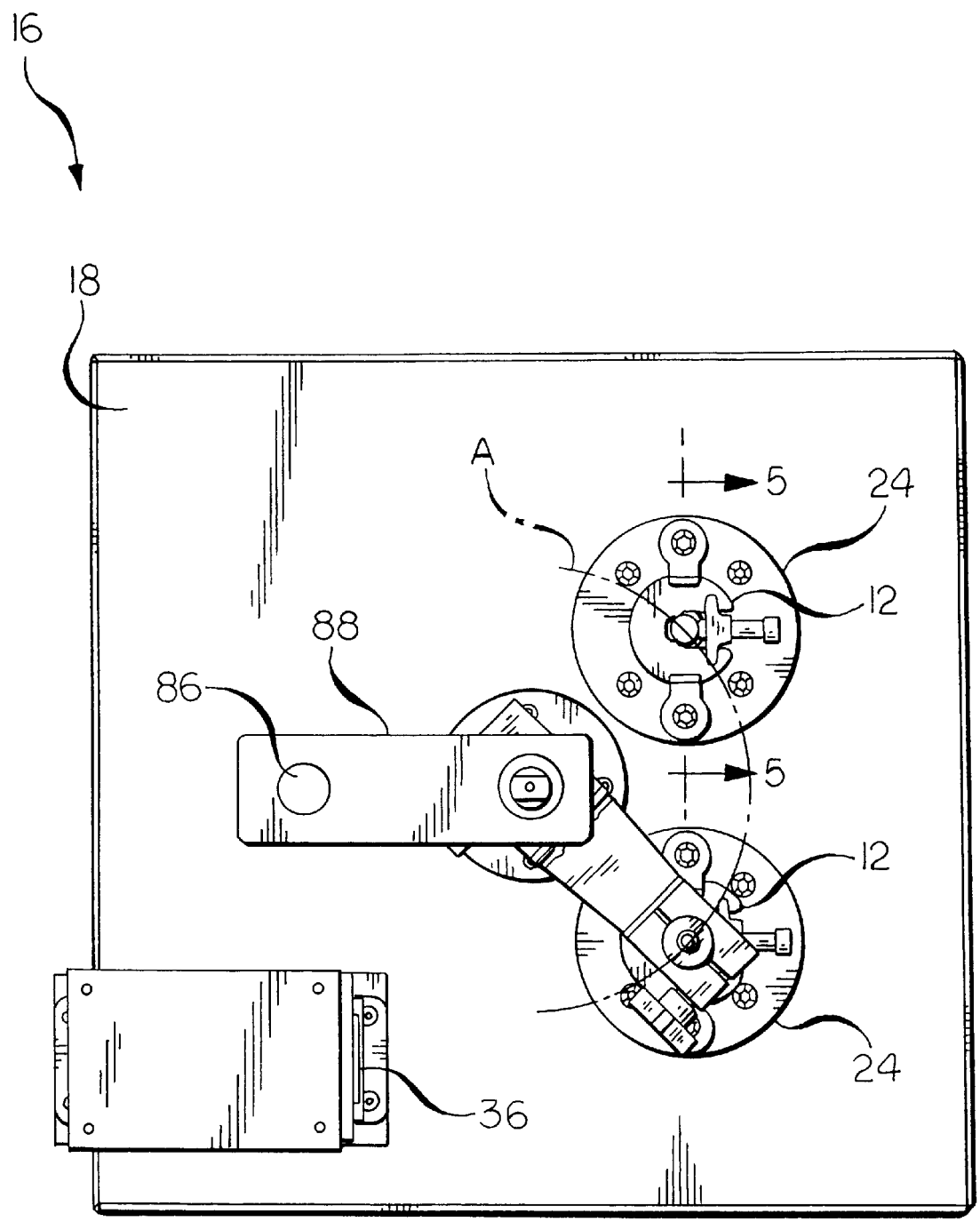
FIG. 3 is an enlarged, top plan view of the device illustrated in FIG. 1.

With reference now to FIGS. 1 through 3, wherein like numerals designate like components throughout all of the several Figures, the position-adjusting device 10 of the invention is adapted for use in presetting the position of machine tools T. A plurality of machine tools T are adapted to be supported by a plurality of clamps 12. The position of each tool T relative to a respective clamp 12 is measured by a gauging system 14. The gauging system 14 permits the position of each tool T to be uniformly preset.

The position-adjusting device 10 includes a base 16. The base 16 includes a flat surface defined by a surface plate 18. In the preferred embodiment, the surface plate 18 is formed from granite. In this particular embodiment, the surface plate 18 is 20.00 inches long and 20.00 inches wide. The thickness of the surface plate 18 is four inches. The surface plate 18 is milled to define a precision flat surface. The surface plate 18 may be supported by legs 20. The legs 20 may be secured to the bottom of the surface plate 18 by fasteners 22.

Each clamp 12 is adapted to be supported relative to the surface plate 18. In a preferred embodiment, each clamp 12 is adapted to be supported by a pot 24 (shown in FIG. 5). Each clamp 12 may be secured to a pot 24 by a pair of hook clamp assemblies 28. Each hook clamp assembly 28 is preferably a model 41905 hook clamp assembly manufactured by Jergens of Cleveland, Ohio which is a ⅜-16×3 inch hook clamp. The hook clamp assemblies 28 include a hook through which a fastener passes. A spring beneath the hook urges the hook upwardly. The fastener may be tightened downwardly relative to the surface plate 18 against the force of the spring to force the hook downwardly into contact with the clamp 12. To release the clamp 12, the fastener may be loosened. As the fastener is loosened, the spring urges the hook upwardly away from the clamp 12. In this position, the hook may be turned so that it does not interfere with the removal of the clamp 12 from the pot 24.

The pots 24 are supported relative to the flat surface defined by the surface plate 18. This may be accomplished in any suitable manner. For example, each pot 24 may be secured to a respective sleeve. Each sleeve may be pressed into a bore in the surface plate 18. Each sleeve may have an integral flange that is adapted to be recessed in the surface plate 18 so that it is flush with the flat surface. Each flange may be provided with a plurality of threaded holes that are adapted to align with holes in a respective pot 24. Fasteners may pass through the holes in the pots 24 and engage the threaded holes in the flanges to secure the pots 24 to the flanges.

The relative position of each pot 24 is co-planar with each other pot 24. This co-planar relationship permits each tool T to be uniformly positioned in its respective clamp 12 relative to each other tool T.

Figure 5:
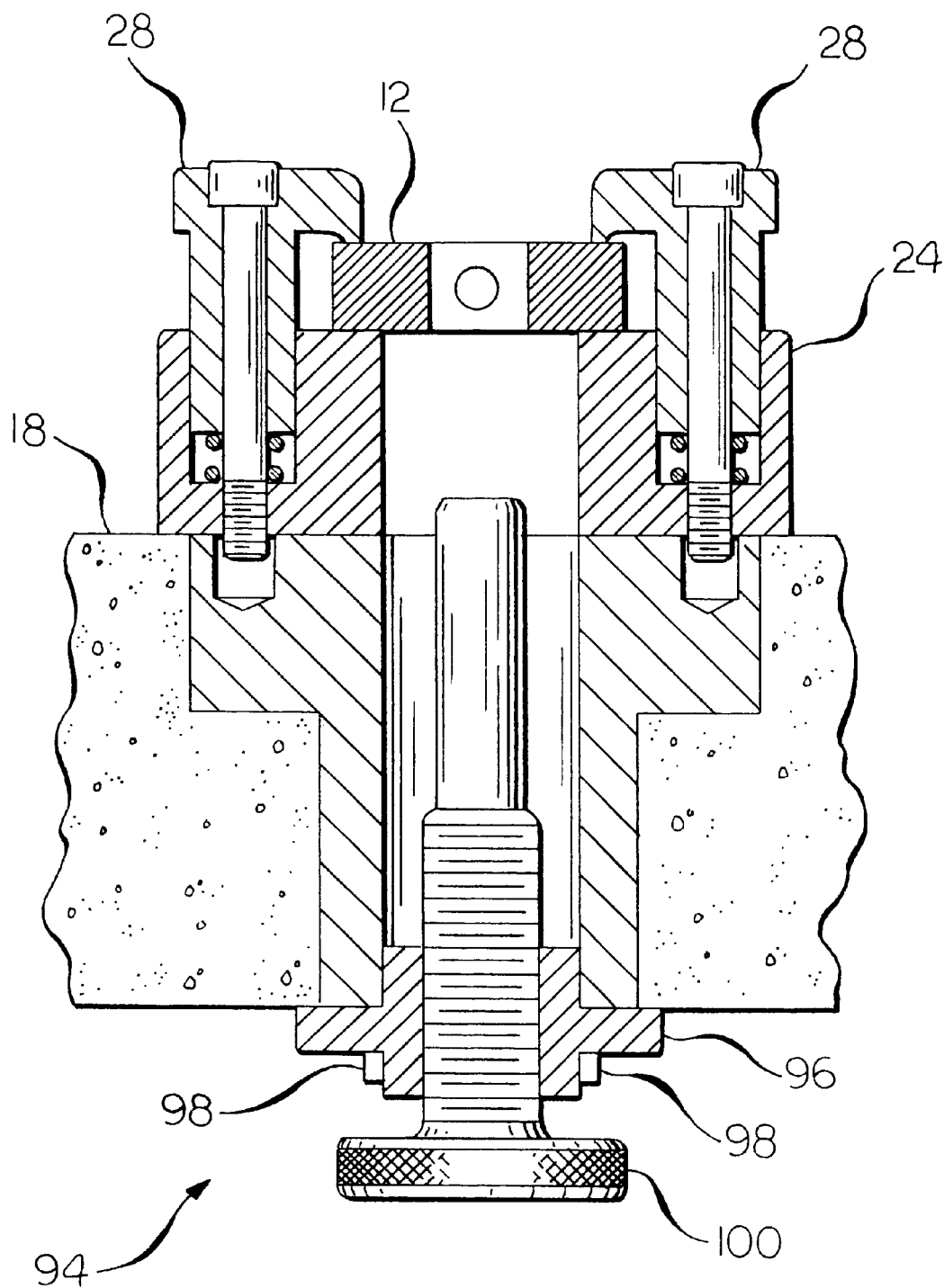
FIG. 5 is an enlarged, cross-sectional view of a pot and an adjustment member of the device taken along the line 5—5 in FIG. 3.

The position of each tool T may be adjusted independently by a respective adjustment member 94 (shown in FIG. 5). Each adjustment member 94 is preferably disposed in a hole in the surface plate 18 beneath a respective pot 24. Each adjustment member 94 preferably includes an adjusting screw housing 96 inserted into a respective hole in the surface plate 18. Each adjusting screw housing 96 has a flange that abuts the bottom of the surface plate 18 and is fastened to the surface plate 18 by fasteners 98. A fine adjusting screw 100 is threaded into each adjusting screw housing 96. An end of the fine adjusting screw 100 is adapted to engage a tool T in a pot 24. The tool T is displaced by turning the fine adjusting screw 100. The position of the tool T being adjusted is measured by the gauging system 14. A clockwise rotation of a right-handed fine adjusting screw 100 lowers the tool T while a counter-clockwise rotation raises the tool T.

With reference to FIGS. 1 through 3, the gauging system 14 includes a measuring unit 32 and a display unit 36. In the preferred embodiment, the measuring unit 32 is a DG2058P manufactured by Sony. The measuring unit 32 may be provided with an optional ceramic tip 34. The display unit 36 is a LT 20-101C manufactured by Sony. The measuring unit 32 is connected to the display unit 36. The ceramic tip 34 is adapted to engage each tool T independently to sense the position of each tool T. The position of the ceramic tip 34 is measured by the measuring unit 32. The display unit 36 provides a visual indication representing the position of the ceramic tip 34. Varying the position of the tool T varies the position of the ceramic tip 34. Hence, the display provides a visual indication of the position of each tool T independently as the position of each tool T is adjusted.

In the preferred embodiment, the display unit 36 is contained in a measuring unit housing 46. The measuring unit housing 46 is supported in spaced relation relative to the base 16 by a support. The support includes a panel-mounting shaft 54 which supports a panel mounting plate 56. The panel mounting shaft 54 is secured to the base 16, such as by the fastener 58 shown in FIG. 2. The measuring unit housing 46 is secured to the panel mounting plate 56. The panel mounting plate 56 is preferably adapted to pivot relative to the panel-mounting shaft 54 to permit the angle of the display unit 36 to be adjusted.

The measuring unit 32 is supported by a support. In the preferred embodiment, the support is defined by a clamp 62, which is adapted to hold the measuring unit 32. The clamp 62 is supported by a pivot bar defined by a post 68. The clamp 62 includes opposing clamp ends. A first clamp end is adapted to support the measuring unit 32. A second clamp end is adapted to be secured to the post 68. Each clamp end includes a stud type knob 64, 66. A first one of the knobs 64 can be loosened to release the measuring unit 32 from the first end of the clamp 62. A second one of the knobs 66 can be loosened to permit the second end of the clamp 62 to be loosened relative to the post 68. Upon loosening the second end of the clamp 62, the clamp 62 can be moved to vary the elevation of the clamp 62 to accommodate different size tools.

The post 68 is adapted to pivot to permit the clamp 62 to move within a plane P (shown in FIG. 2) parallel to the flat surface defined by the surface plate 18. This permits the measuring unit 32 to move along an arc A (shown in FIG. 3) within a plane parallel to the flat surface. The pots 24 are arranged along an arc having a radius equal to the arc A of movement of the measuring unit 32 and a focal point coaxial to that of the arc A of movement of the measuring unit 32. Hence, the measuring unit 32 can be aligned with each tool T supported by each clamp 12.

Figure 4:
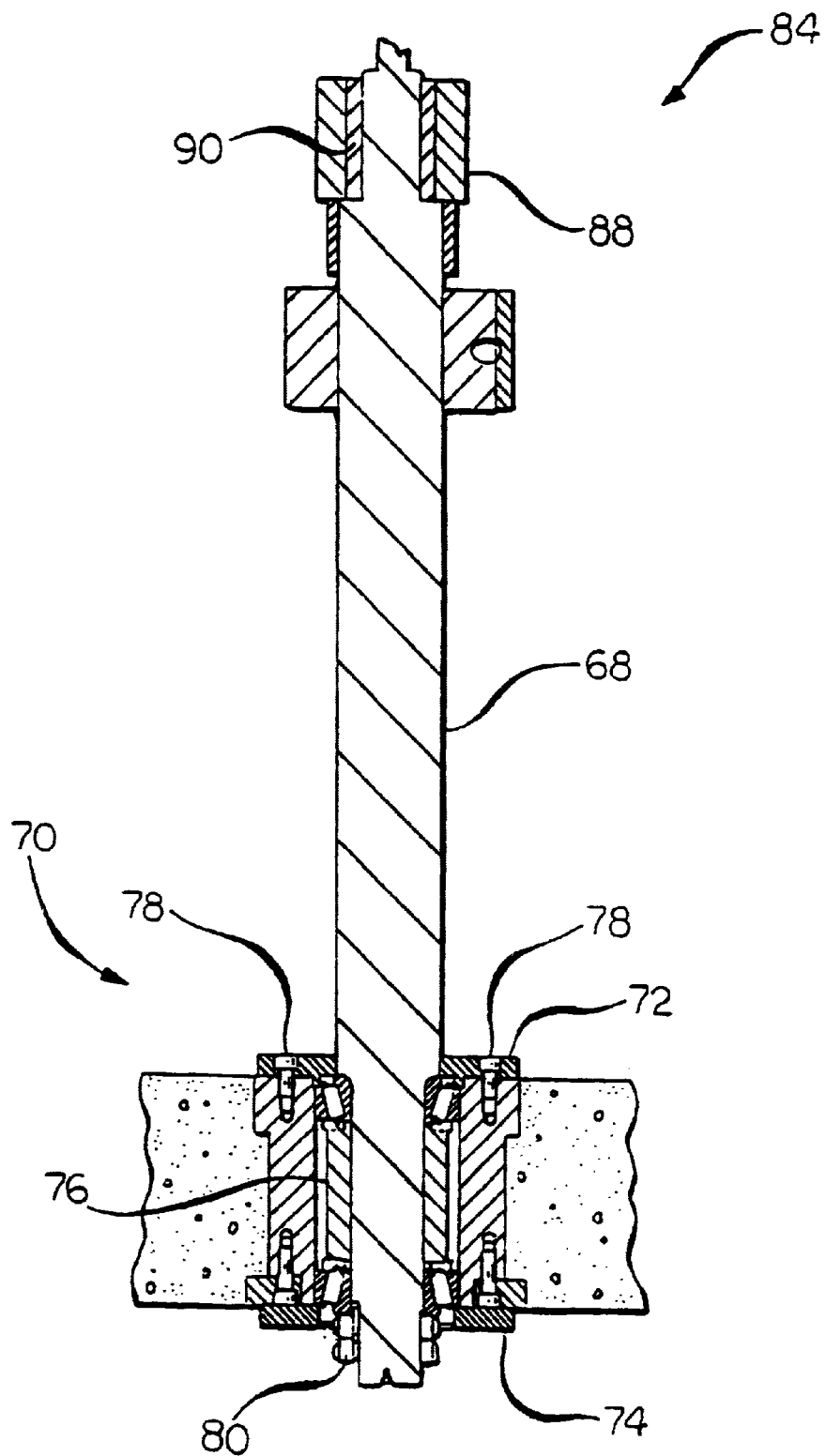
FIG. 4 is an enlarged, cross-sectional view of a measuring unit of the device taken along the line 4—4 in FIG. 2.

The post 68 is pivotally supported by the surface plate 18 by a tapered roller bearing assembly 70 (shown in FIG. 4), such as cone bearing #15125 and cup bearing #15245 manufactured by Timken of Keene, N.H. In the preferred embodiment, the tapered roller bearing assembly 70 includes tapered roller bearings supported by a reduced diameter portion of the post 68. The roller bearings are held in spaced relation to one another by a bearing spacer 76. The post 68 and the tapered roller bearing assembly 70 are received in a hole provided in the surface plate 18. Bearing retainers 72, 74 retain the tapered roller bearing assembly 70 in the hole. One retainer 72 is held in place be fasteners 78. A locknut 80 is threaded onto a threaded end of the post 68 to fix the post 68 in an axial position relative to the tapered roller bearing assembly 70. A lock washer (not shown) is provided to reduce the risk of the locknut 80 loosening. The lock washer abuts the other bearing retainer 74.

In the preferred embodiment, an end of the post 68 opposite the threaded end is pivotally secured to a support shaft 84. The support shaft 84 includes a contact bar 88 and a stationary shaft 86. A sleeve bearing 90 is interposed between an end of the contact bar 88 and the end of the post 68 opposite the threaded end. The sleeve bearing 90 is preferably a bronze sleeve bearing, such as the SS3248-32 manufactured by Symmco of Sykesville, Pa. An opposite end of the contact bar 88 is secured to an end of the stationary shaft 86, such as by press-fitting the end of the stationary shaft 86 into the contact bar 88. An opposite end of the stationary shaft 86 is secured to the surface plate 18 by a fastener 92. The post 68, the stationary shaft 86, and the contact bar 88 form a pi configuration. The post 68 and stationary shaft 86 are arranged parallel to one another and the contact bar 88 is arranged perpendicular relative to the post 68 and stationary shaft 86.

In operation, the position-adjusting device 10 permits the position of a plurality of tools to be adjusted to a common position relative to one another. For example, the two pots 24 shown may each accommodate a tool by placing the tools in the clamps 12. With a first tool T placed in a first one of the clamps 12, the measuring unit 32 may be adjusted to engage the ceramic tip 34 with an end of the tool T. This may be accomplished by first aligning the ceramic tip 34 with the tool T. With the ceramic tip 34 aligned with the tool T, the knob 66 may be loosened to slide the clamp 62 axially relative to the post 68 until the ceramic tip 34 engages an end of the tool T. Now, the position of the tool T may be adjusted by turning the fine adjusting screw 100 beneath a corresponding pot 24. The variation in the position of the tool T may be monitored on the display unit 36 as the position of the tool T is adjusted. Once the tool T has been adjusted to a desired position, the tool T may be secured in its respective clamp 12. At this juncture, the measuring unit clamp 62 may be displaced within a plane parallel to the flat surface of the surface plate 18 by pivoting the post 68. As this occurs, the measuring unit 32 moves along an arc A. The measuring unit clamp 62 is displaced until the measuring unit 32 aligns with a second tool (not shown). With the ceramic tip 34 of the measuring unit 32 engaging the second tool, the position of the second tool may be adjusted to the exact position of the first tool T. This is accomplished by adjusting a fine adjusting screw 100 beneath the second tool until the display unit 36 displays the same position measurement as displayed for first tool T. At this point, the second tool may be secured within its respective pot 24 by tightening its respective clamp 12.

A method for adjusting the position of a tool comprises the steps of providing a clamp and a measuring device spaced apart from the clamp. A tool is inserted into the clamp. The tool is engaged with the measuring device. The position of the tool is adjusted to achieve a desired measurement by the measuring device. The clamp is then tightened upon the tool to hold the tool in a fixed position.

A method according to the invention may provide at least one additional clamp. The clamps are supported in a co-planar relationship with one another. An additional tool is inserted in the additional clamp. The measuring device is aligned with the additional tool after the first clamp is tightened to hold the first tool in a fixed position. The measuring device is engaged with the additional tool. The position of the additional tool is adjusted to achieve a measurement by the measuring device identical to the measurement achieved with respect to the first tool. The additional clamp is then tightened upon the additional tool to hold the additional tool in a fixed position.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A device for adjusting the position of machine tools relative to tool clamps, said device comprising:
   a surface plate defining a flat surface;
   a plurality of tool clamps supported relative to said flat surface, each said tool clamp being adapted to support a tool;
   an adjustment member adapted to adjust each tool relative to a respective one of said tool clamps; and
   a gauging system including a measuring unit adapted to engage each of the tools in each respective one of said tool clamps and to move to any desired position along a common plane to permit said measuring unit to align with each of the tools supported by each respective tool clamp.

2. The device of claim 1, further including a plurality of pots secured to said surface plate, each said pot being adapted to support a respective one of said tool clamps.

3. The device of claim 2, wherein each said tool clamp is adapted to be secured to a respective one of said pots by a clamp assembly.

4. The device of claim 1, wherein each said adjustment member includes a fine adjusting screw having an end that is adapted to engage each respective one of the tools in each respective one of said tool clamps.

5. The device of claim 4, wherein each said fine adjusting screw is threaded into a respective adjusting screw housing supported relative to said surface plate.

6. The device of claim 1, further including a gauging system including a measuring unit and a display unit connected to the measuring unit, said measuring unit being adapted to engage each of the tools in each respective one of said tool clamps, said display unit providing a visual indication representing the position of each tool as the position of the tool is adjusted.

7. The device of claim 6, wherein said measuring unit is supported by a measuring unit clamp being supported by a pivot bar.

8. The device of claim 7, wherein said measuring unit clamp includes opposing clamp ends, a first one of said clamp ends is adapted to support said measuring unit, and a second one of said clamp ends is adapted to be secured to said pivot bar.

9. The device of claim 7, wherein said pivot bar is adapted to pivot to permit said measuring unit clamp to move within a plane parallel to said flat surface defined by said surface plate to permit said measuring unit to align with each of the tools supported by each respective tool clamp.

10. The device of claim 6, wherein said measuring unit is adapted to move along an arc and said tool clamps are arranged along an arc having a radius equal to the arc of movement of said measuring unit and a focal point coaxial to that of the arc of movement of said measuring unit.

11. The device of claim 7, wherein an end of said pivot bar is pivotally secured to a support shaft.

12. A device for adjusting the position of machine tools relative to tool clamps, said device comprising:
    a surface plate defining a flat surface;
    a plurality of tool clamps supported relative to said flat surface, each said tool clamp being adapted to support a tool;
    a plurality of adjustment members, each said adjustment member being adapted to adjust each tool relative to a respective one of said tool clamps; and a gauging system including:
- a measuring unit; and
  - a display unit connected to said measuring unit, said measuring unit being adapted to engage each of the tools in each said tool clamp, said display unit providing a visual indication representing the position of each tool as the position of the tool is adjusted.

13. The device of claim 12, further including a plurality of pots secured to said surface plate, each said pot being adapted to support a respective one of said tool clamps.

14. The device of claim 13, wherein each said tool clamp is adapted to be secured to a respective one of said pots by a clamp assembly.

15. The device of claim 12, wherein each said adjustment member includes a fine adjusting screw threaded into an adjusting screw housing supported relative to said surface plate, each said fine adjusting screw having an end that is adapted to engage the tool in each respective one of said tool clamps.

16. The device of claim 12, wherein said measuring unit is supported by a measuring unit clamp being supported by a pivot bar, said measuring unit clamp including opposing clamp ends, a first one of said clamp ends being adapted to support said measuring unit, a second one of the clamp ends is adapted to be secured to said pivot bar.

17. The device of claim 16, wherein said pivot bar is adapted to pivot to permit said measuring unit clamp to move within a plane parallel to said flat surface defined by said surface plate to permit said measuring unit to align with each of the tools supported by each respective tool clamp.

18. The device of claim 17, wherein said measuring unit is adapted to move along an arc and said tool clamps are arranged along an arc having a radius equal to the arc of movement of said measuring unit and a focal point coaxial to that of the arc of movement of said measuring unit.

19. A method for adjusting the position of a tool relative to a tool clamp comprising the steps of:
   (a) providing a clamp and a measuring device spaced apart from the clamp;
   (b) inserting a tool into the clamp;
   (c) engaging the tool with the measuring device;
   (d) adjusting the position of the tool to achieve a desired measurement as determined by the measuring device; and
   (e) tightening the clamp upon the tool to hold the tool in a fixed position;
   (f) providing at least one additional clamp;
   (g) supporting the clamps in a co-planar relationship with one another;
   (h) inserting an additional tool in the additional clamp;
   (i) aligning the measuring device with the additional tool after step (e) and engaging the additional tool with the measuring device;
   (j) adjusting the position of the additional tool to achieve a measurement as determined by the measuring device identical to the measurement achieved in step (d); and
   (k) tightening the additional clamp upon the additional tool to hold the additional tool in a fixed position.

* * * * *